United States Patent
Deivasigamani et al.

(10) Patent No.: US 9,014,697 B2
(45) Date of Patent: Apr. 21, 2015

(54) WIRELESS NETWORK SELECTION

(75) Inventors: Giri Prassad Deivasigamani, San Jose, CA (US); Suresh Nagaraj, Sunnyvale, CA (US); Gaurav R. Nukala, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 13/438,084

(22) Filed: Apr. 3, 2012

(65) Prior Publication Data
US 2013/0260757 A1    Oct. 3, 2013

(51) Int. Cl.
*H04W 4/00*    (2009.01)
*H04W 74/00*    (2009.01)
*H04W 24/00*    (2009.01)
*H04W 48/18*    (2009.01)

(52) U.S. Cl.
CPC .............. *H04W 24/00* (2013.01); *H04W 48/18* (2013.01)

(58) Field of Classification Search
USPC .................. 455/435.3, 445, 466; 370/338
See application file for complete search history.

(56) References Cited

U.S. PATENT DOCUMENTS

| | | | |
|---|---|---|---|
| 8,229,432 B2 * | 7/2012 | Fox et al. .................... | 455/435.3 |
| 8,249,505 B1 * | 8/2012 | Goldner et al. .............. | 455/41.2 |
| 2002/0198980 A1 | 12/2002 | Najafi | |
| 2005/0083899 A1 * | 4/2005 | Babbar et al. ................. | 370/342 |
| 2007/0019670 A1 * | 1/2007 | Falardeau ..................... | 370/465 |
| 2008/0244095 A1 * | 10/2008 | Vos et al. ...................... | 709/250 |
| 2008/0304455 A1 * | 12/2008 | Simonsson et al. .......... | 370/338 |
| 2009/0028082 A1 | 1/2009 | Wynn et al. | |
| 2010/0080174 A1 * | 4/2010 | Zhu et al. ...................... | 370/328 |
| 2013/0065596 A1 * | 3/2013 | Frederiksen et al. ......... | 455/436 |

FOREIGN PATENT DOCUMENTS

| | | |
|---|---|---|
| JP | 2008-263612 | 10/2008 |
| WO | WO 2005/027556 | 3/2005 |

* cited by examiner

*Primary Examiner* — William Nealon
(74) *Attorney, Agent, or Firm* — Womble Carlyle Sandridge & Rice, LLP

(57) ABSTRACT

A method and apparatus for wireless network selection by a wireless mobile device is disclosed. In one embodiment, network performance metrics related to the wireless networks to be considered can be evaluated. The network performance metrics can be weighted and a related ranking metric can be determined. The ranking metric can be used to select a wireless network. In one embodiment, network performance metrics can include a round trip time, which describes a round trip data transit time between the wireless mobile device to a particular network device, and a power metric describing the amount of power needed to transfer an amount of data.

20 Claims, 12 Drawing Sheets

| Mode | RSSI Weight | SNR Weight | RTT Weight | Power Weight | |
|---|---|---|---|---|---|
| Equal Weights | 0.25 | 0.25 | 0.25 | 0.25 | 610 |
| SNR preferred (ignore power) | 0.25 | 0.5 | 0.25 | 0.00 | 612 |
| RTT preferred | 0.20 | 0.20 | 0.40 | 0.20 | 614 |
| Power preferred | 0.20 | 0.20 | 0.20 | 0.40 | 616 |
| Equal Weights (ignore power) | 0.33 | 0.33 | 0.33 | 0.00 | 618 |
| | 601 | 602 | 604 | 606 | 608 |

Weighting Profiles    600

| Mode | RSSI Weight | SNR Weight | RTT Weight | Power Weight | |
|---|---|---|---|---|---|
| Equal Weights | 0.25 | 0.25 | 0.25 | 0.25 | 610 |
| SNR preferred (ignore power) | 0.25 | 0.5 | 0.25 | 0.00 | 612 |
| RTT preferred | 0.20 | 0.20 | 0.40 | 0.20 | 614 |
| Power preferred | 0.20 | 0.20 | 0.20 | 0.40 | 616 |
| Equal Weights (ignore power) | 0.33 | 0.33 | 0.33 | 0.00 | 618 |

601   602   604   606   608

Weighting Profiles

|      | RSSI (dBm) | SNR (dB) | RT (ms) | Power (j/kbyte) |      |
|------|------------|----------|---------|-----------------|------|
| LTE  | -60        | 30       | 40      | 0.25            | ~ 802 |
| WiFi | -60        | 25       | 45      | 0.15            | ~ 804 |
| CDMA | -50        | 30       | 60      | 0.1             | ~ 806 |
|      | 810        | 812      | 814     | 816             |      |

800

Radio Performance Data

Figure 8

|      | $RSSI_{NORM}$ | $SNR_{NORM}$ | RTT | Power |
|------|-------|-------|-----|-------|
| LTE  | 0.806 | 1.0   | 40  | 0.25  |
| WiFi | 0.455 | 0.714 | 45  | 0.15  |
| CDMA | 0.667 | 0.85  | 60  | 0.1   |

910   912   914   916

900

Processed Network Data

Figure 9

WIRELESS NETWORK SELECTION

FIELD OF THE DESCRIBED EMBODIMENTS

The described embodiments relate generally wireless communication and more particularly to methods for selecting a wireless network for data transfer data by a mobile wireless device.

BACKGROUND

Wireless devices are useful appliances that can allow a user to access data and run applications without being physically tethered to a network. Such applications can run the gamut from simple text communications to web browsing to more sophisticated communication programs sharing both video and voice data between users.

Smart phones are one example of a wireless device. Smart phones typically can provide phone and data service through a cell phone carrier. However, such wireless devices are often not limited to a single data pathway. Many wireless devices include circuitry to access other wireless networks (other than cell phone networks). One example is a network governed by one or more versions of the IEEE 802.11 wireless communication specification. Some wireless devices can support multiple cell phone networks (e.g., a wireless device can support CDMA (carrier detect, multiple access) and GSM (Groupe Special Mobile) cell phone networks) as alternative wireless networks.

Since wireless devices can access multiple wireless networks, wireless devices often select a particular wireless network to operate on. Such selections can be made blindly, relying only on the existence of a preferred network and not evaluating other factors that can affect overall user experience. For example, there can be conditions when a preferred network offers slower data throughput because of a noisy communication channel, poor wireless signal quality or other impairments. Clearly, selecting this network would frustrate the user by presenting sluggish responses to programs or user input.

Therefore, what is desired is an effective way to identify and select a wireless network that can improve the user experience.

SUMMARY OF THE DESCRIBED EMBODIMENTS

This paper describes various embodiments that relate to a wireless mobile device operating within two or more radio access technologies. Methods and apparatus are described that can enable the wireless mobile device to characterize particular performance aspects of the radio access technologies and can enable the wireless mobile device to rank and select one of the radio access technologies for transferring data.

In one embodiment, a method for selecting a radio access technology can include the steps of gathering network performance metrics related to the radio technologies under consideration, selecting a weighting profile in accordance with an operational mode, using the weighting profile to emphasize particular network performance metrics, determining a rank metric in accordance with the weighted performance metrics, and selecting the radio access technology in accordance with the determined rank. Network performance metrics can characterize one or more performance aspects of a particular network. One or more performance metrics can be emphasized (or de-emphasized) though the weighting profile. A rank metric for each radio access technology under consideration can be determined from the weighted network performance characteristics. A radio access technology can be selected in accordance with the determined rank.

In one embodiment, a wireless device configured to select a radio access technology can include two or more radio transceivers, where the radio transceivers can operate with different radio access technologies. The wireless device can further include a selector for coupling data between a processor and the radio transceivers. The processor can be configured to select a radio transceiver according to weighted network performance metrics corresponding to the radio technology of the radio transceivers.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6 is a table of exemplary weighting profiles that can be applied to network performance metrics in accordance with the specification.

FIG. 8 shows exemplary network performance data gathered for three radio access technologies.

FIG. 9 illustrates optionally processing network performance data as set forth in the specification.

DETAILED DESCRIPTION OF SELECTED EMBODIMENTS

Figure 1:
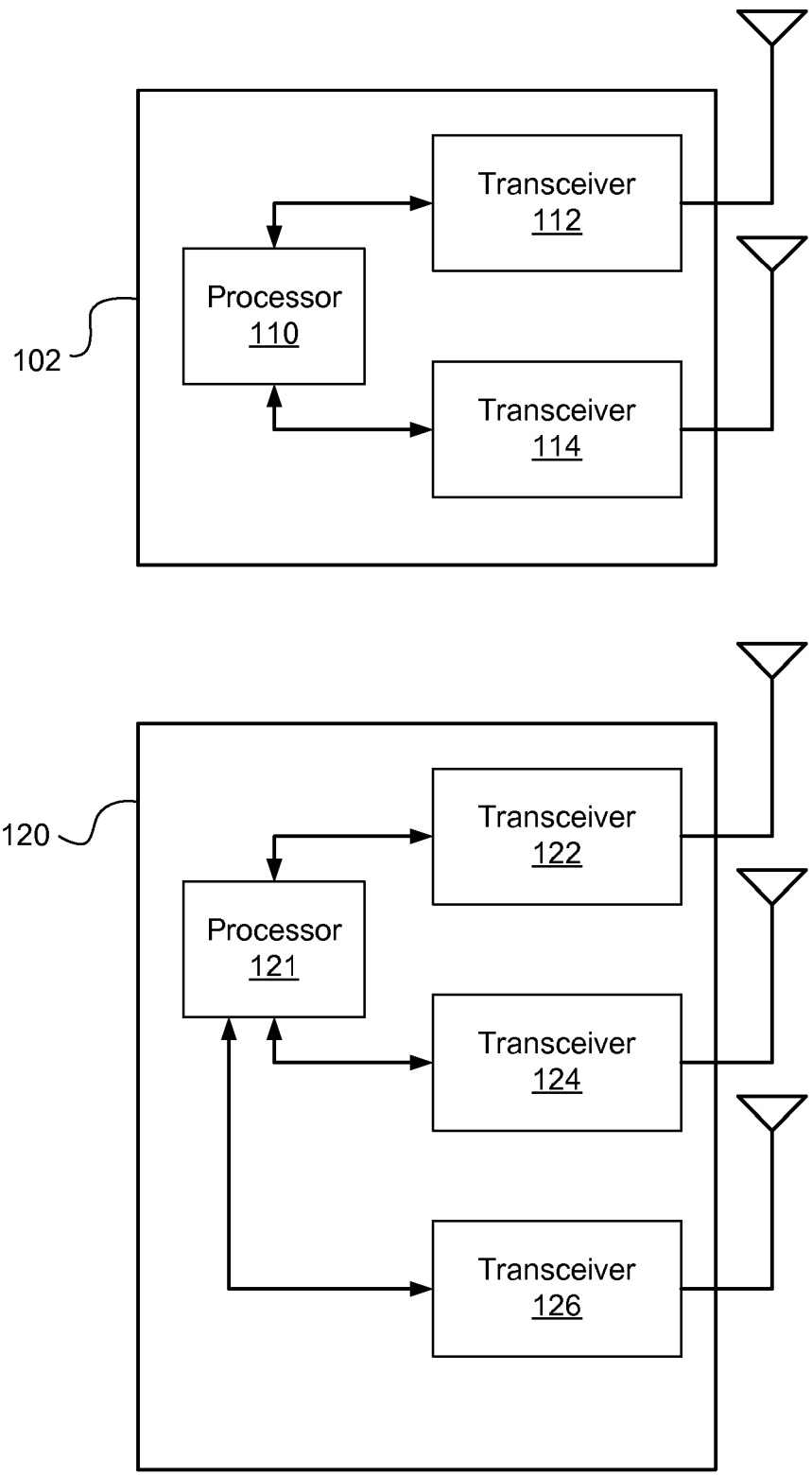
FIG. 1 illustrates exemplary embodiments of wireless devices in accordance with the specification.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Wireless devices can provide not only voice phone functionality to a user, but can, for example, also provide additional functionality such as text messaging, instant messaging and internet browsing. Additionally, a processor within the wireless device can execute applications that can require a connection to at least one specific server. For example, sending and receiving email may require a connection to at least one mail server.

Wireless devices can often include more than one system to transfer data between the wireless device and a desired service, such as a server. For example, a cell phone can transfer voice and data through a preferred cell phone network. Often, the cell phone can access a secondary or tertiary cell phone network. These alternative networks may not be a preferred network provider, but can for example, be a roaming network. Furthermore, the alternative network may have a different performance level when compared to the preferred network. For example, an alternative network may support a higher data throughput than a preferred network because of wireless channel conditions or proximity to a cell tower.

Wireless devices can also include a mechanism to connect to non-voice networks, such as those networks conforming to at least one version of IEEE 802.11. Such network alternatives can provide lower cost data connections, but can also have varied performance levels when compared to either the preferred network or alternative network connections.

Collectively, these alternative wireless connections can be referred to as radio access technologies (RATs). One approach for selecting a RAT gathers performance data (performance metrics) for each of the RATs under consideration. In order to have a relatively fair comparison, the wireless RATs under consideration can have equivalent performance metrics. For example, all RATs under consideration can include a signal strength metric. Also, the performance data related to a particular performance metric for each individual radio technology can optionally be normalized so that the performance data for different radio technologies can be more fairly compared.

The gathered performance data (optionally normalized) can be weighted to emphasize those characteristics (metrics) that may be considered more important relative to other characteristics when selecting a RAT. Furthermore, some radio performance metrics may be considered less important for selecting a RAT. These metrics can be weighted to have less emphasis on the RAT decision.

In one embodiment, a weighting profile can describe the weights associated with particular gathered performance data. The weighting profile can act as a predefined setting to emphasize the importance of one or more performance metrics when choosing a RAT. In one embodiment, there can be two or more weighting profiles. A selected weighting profile can be modified to accommodate changing environmental conditions or changing performance requirements. After applying the weighing factors to the gathered radio performance data, the available RATs can be ranked and one RAT can be selected for use by the wireless device. This selection and ranking process can occur periodically or as requested by software or a user.

FIG. 1 illustrates exemplary embodiments of wireless devices in accordance with the specification. In one embodiment, wireless device 102 can select between a first and a second RAT. Often, each RAT can be associated with a wireless transceiver included in wireless device 102. Wireless device 102 can include processor 110, first wireless transceiver 112 and second wireless transceiver 114. Wireless device 102 can be a cell phone, a personal digital assistant, laptop, a tablet computer or other similar device. In this embodiment, the first wireless transceiver 112 can be used to transfer data though a cell phone network using a wireless protocol such as LTE (Long Term Evolution) Advanced. The second wireless transceiver 114 can be used to transfer data through a separate radio network, such as one in accordance with a version of the IEEE 802.11 standard. In one embodiment, transceivers 112 and 114 can operate independently, and oftentimes, within different frequency spectra. Thus, transceivers 112 and 114 can enable wireless device 102 to select between two RATs.

In some embodiments, a wireless device can include more than two wireless transceivers. More wireless transceivers can provide more selection choices RATs and can provide more flexibility for wireless connections. Wireless device 120 includes three wireless transceivers, 122, 124 and 126. Note that although three wireless transceivers are shown here, separate physical transceivers may not be required for each radio access technology. For example, the first wireless transceiver 112 can be configured for use in an LTE Advanced network, the second wireless transceiver 124 can be configured for use in an IEEE 802.11 compliant network and the third wireless transceiver 126 can be configured for use in a 3G network. In one embodiment, the connection provided by the first transceiver 122 and the third transceiver 126 can be realized by a shared circuitry, but operation of the first and third transceivers (122 and 126) may not be simultaneous. This can be particularly advantageous when two radio access technologies may have similar modulation schemes or operate within similar frequency bounds. Furthermore, other possible radio technologies can include networks compatible with the Bluetooth® Special Interest Group, near field communication technologies, Zigbee® and other radio technologies.

Figure 2:
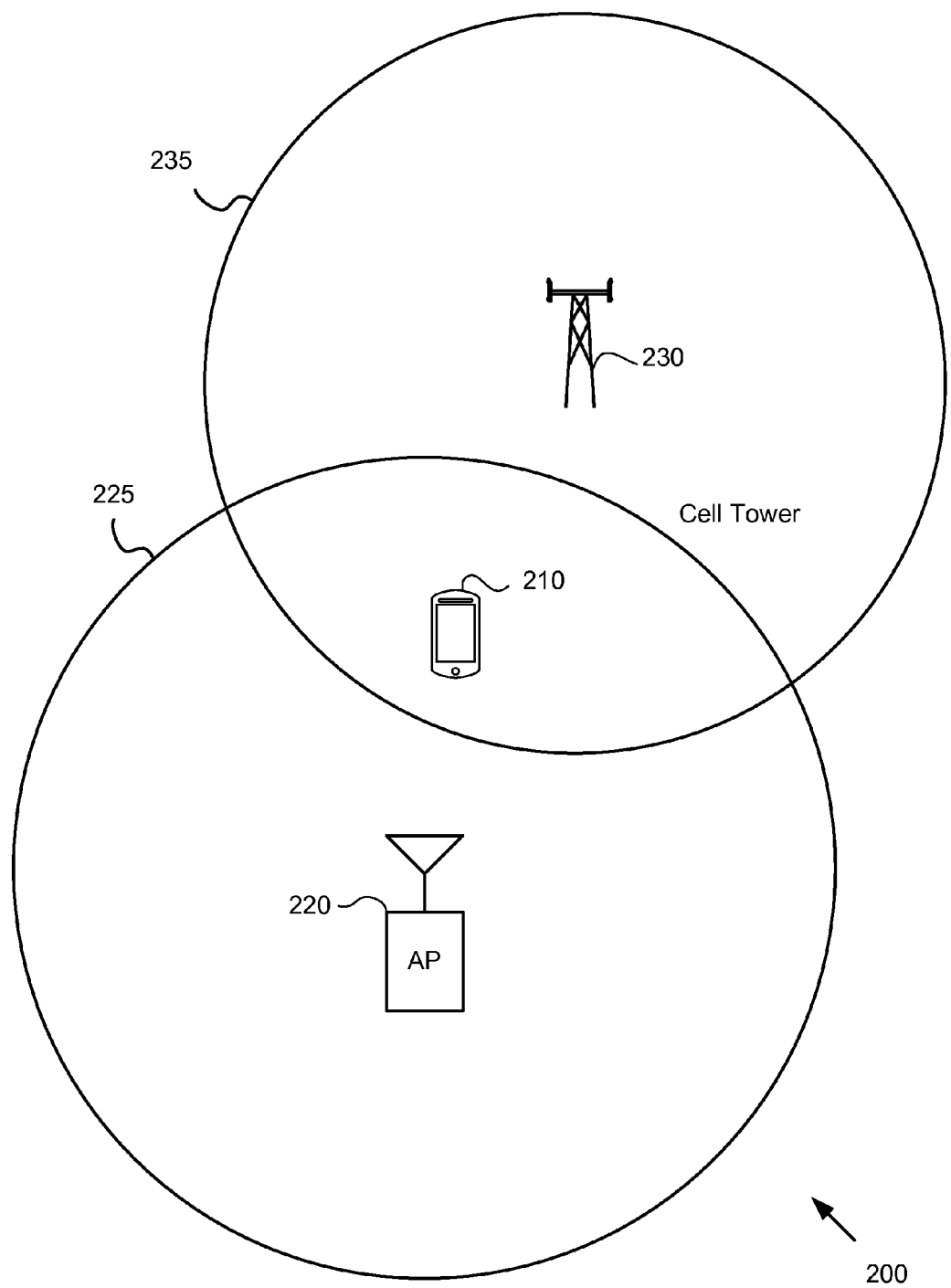
FIG. 2 shows one embodiment of a wireless system.

FIG. 2 shows one embodiment of a wireless system 200. Wireless system 200 can include wireless device 210, cell phone tower 230 and wireless access point 220. By way of example, and not limitation, wireless device 210 can operate in the presence of at least one of two different radio access technologies. Wireless access point 220 can operate as a WiFi access point as described in the IEEE 802.11 specification and can have coverage area 225. Simultaneously, service from cell phone tower 230 can be provided for wireless device 210. The cell phone tower 230 can have coverage area 235. In this example, wireless device 210 can choose to connect to either RAT provided by wireless access point 220 or cell phone tower 230.

Figure 3:
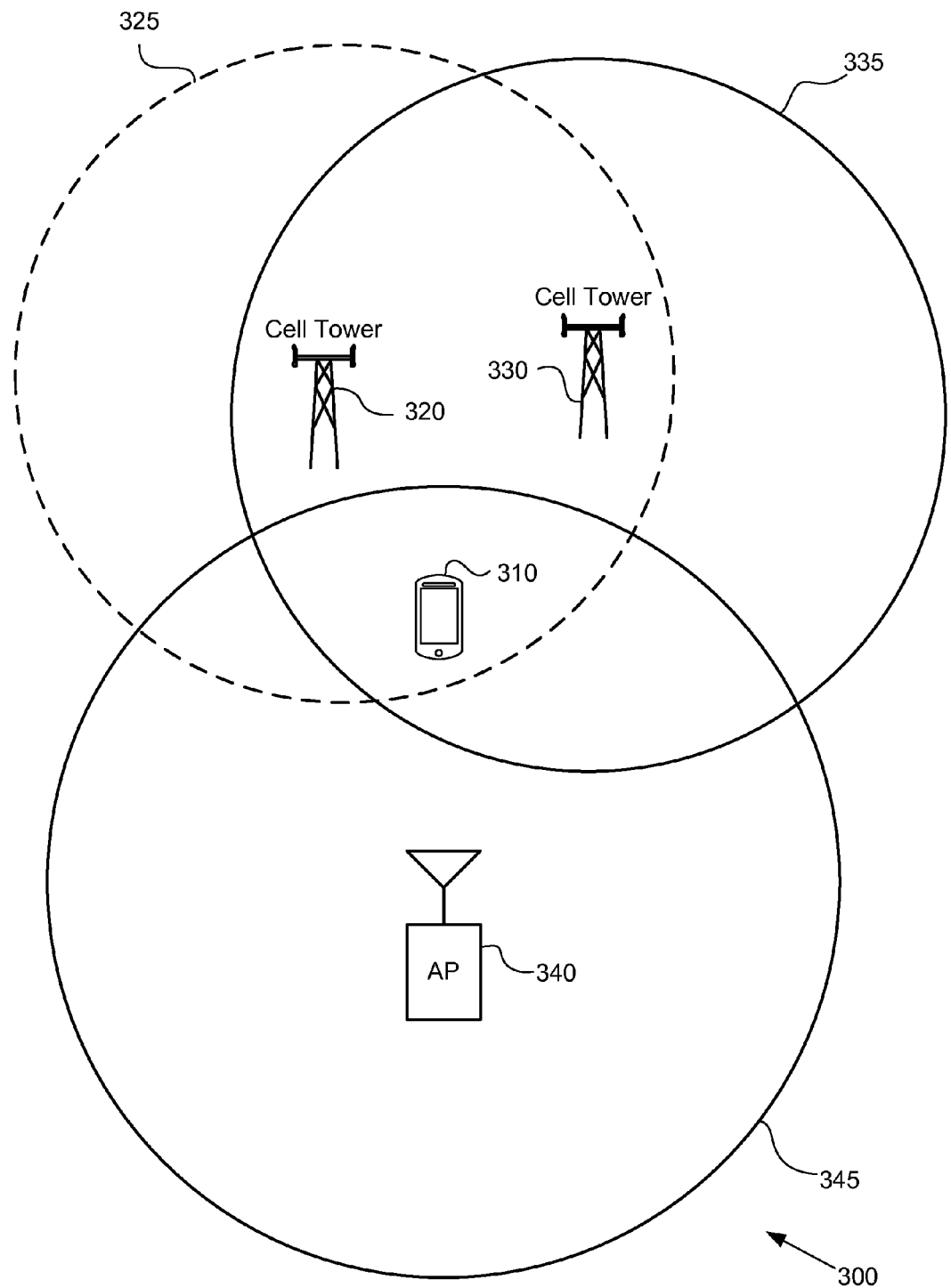
FIG. 3 shows another embodiment of a wireless system.

FIG. 3 shows another embodiment of a wireless system 300. The wireless system 300 can include wireless device 310, first cell tower 320, second cell tower 330, and wireless access point 340. Wireless device 310 can operate in the presence of three distinct radio technologies. In this embodiment, first cell tower 320 can operate using an LTE Advance protocol on a first frequency range with coverage area 325, second cell tower 330 can operate with a CDMA2000 protocol on a second frequency range with coverage area of 335 and wireless access point 340 can operate on a third frequency range and with a third wireless protocol such as one described in the IEEE 802.11 specification. Wireless access point 340 can have coverage area 345. In this embodiment, wireless device 310 can operate under the coverage of more than two radio access technologies. When wireless device 310 is capable of operating within the more than two RATs, then wireless device 310 can have more flexibility in selecting a RAT.

Figure 4:
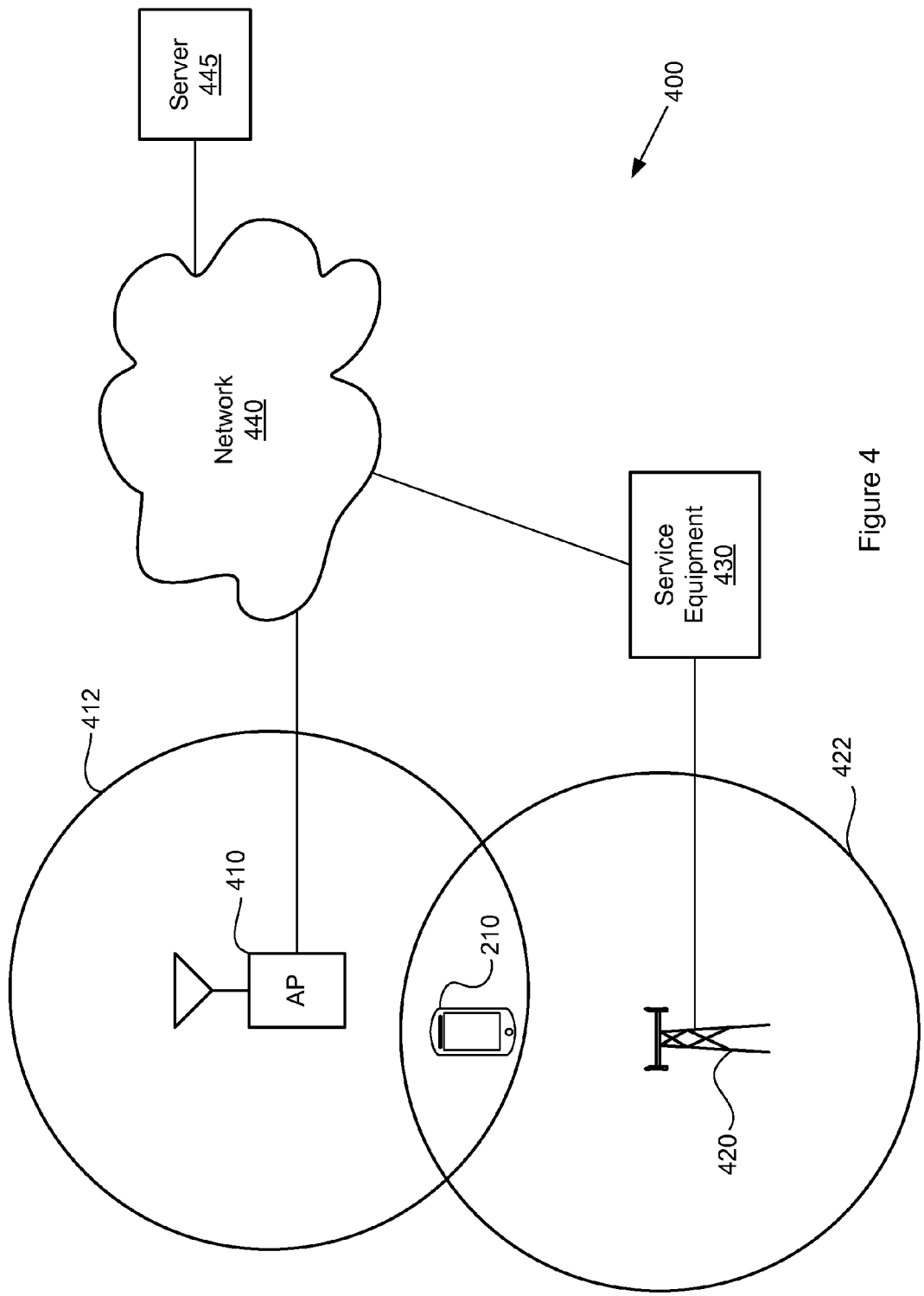
FIG. 4 illustrates yet another embodiment of a wireless system.

FIG. 4 illustrates yet another embodiment of a wireless system 400. Wireless system 400 can include two RATs and wireless device 210. First RAT can include wireless access point 410 providing a coverage area 412. Second RAT can include cell phone tower 420 providing a coverage area 422. Wireless device 210 can connect through either first or second RAT. In this embodiment, wireless device 210 can connect to a network 440 through either the first or second RAT since the wireless device is within the coverage area 412 of the wireless access point 410 and the coverage area 422 of the cell phone tower 420. In one embodiment, the network 440 can be the internet.

Many times, a connection to network 440 is not a direct connection, but rather can be routed and processed by other equipment before coupling to network 440. For example, the second RAT serviced by coverage area 422 can be coupled to the network 440 by service equipment 430. Such service equipment can include switch gear or other processing equipment necessary to couple data from cell phone tower 420 to the network 440. Some amount of throughput delay may be added to data traversing through service equipment 430. The extra delay through service equipment 430 can be undesirable to a user by increasing response times and providing sluggish performance.

Although additional throughput delay can be attributed to the service equipment 430, there can be other sources of delay not shown here, but related to a particular RAT. For example, there can be an amount of delay time attributable to data passing through wireless access point 410 that can be different from an amount of delay time related to cell phone tower 420. If, for example, the wireless access point 410 is a WiFi access point (AP) operating as described in the IEEE 802.11 specification, then wireless access point 410 can operate under one of several prescribed modulation coding schemes (MCS). Every MCS can have a different throughput rate. As is known to persons skilled in the art, bit rates can range from 1 mbit/sec to 300 mbit/sec and beyond. Thus different MCS' can have different processing delays.

By way of example, consider wireless device 210 running an email application where server 445 is an email server. As illustrated in FIG. 4, if wireless device 210 is connected to wireless access point 410, then email on the server 445 can be accessed through the network 440. On the other hand, if the wireless device 210 is connected to network 440 through cell phone tower 420, then some additional processing delay can be added by data passing though service equipment 430. In this example, data access to server 445 can be slower through cell phone tower 420 relative to wireless access point 410, thus, user experience may be less desirable when wireless device 210 connects to server 445 through cell phone tower 420.

Thus, user experience can be improved by selecting RATs which can provide better performance when compared to other available RATs. In one embodiment, a wireless device can more optimally select a RAT by collecting network performance data related to the RATs under consideration. Then, by comparing collected performance data, the wireless device can select a RAT. If the wireless device requires particular resources, then performance metrics can be selected and emphasized in accordance with the desired resource.

Figure 5:
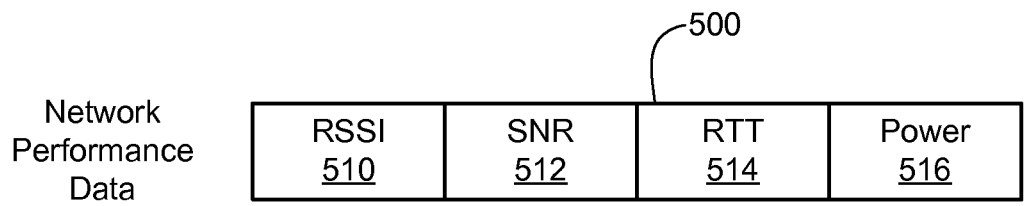
FIG. 5 illustrates four examples of network performance data.

FIG. 5 illustrates four examples of network performance data 500. In one embodiment, the network performance data can be radio performance data. Network performance data need not be limited to these four shown here, but can include any metric that measures at least one aspect of network performance. A first network performance data metric can be receive signal strength indicator (RSSI) 510. Generally, RSSI 510 is an indication from a hardware interface regarding the strength of a received network signal. In wireless applications, the received network signal is typically a received radio signal. RSSI 510 is often reported in dBm (power ratio, in decibels). A dBm is a commonly used reference scale for power expressed as a ratio to a reference unit. For wireless signals, a dBm is typically the ratio of measured power, referenced to one milliwatt. In this example, the dBm can be an absolute unit.

Although RSSI 510 is an absolute unit, some RSSI 510 measurements cannot be easily compared to RSSI 510 measurements of other radio technologies. For example, GSM RSSI radio values can range from −48 to −102 dBm while TDMA RSSI radio values can range from −30 dBm to −110 dBm. In contrast, WiFi signals, as outlined by IEEE 802.11 specifications do not have a strict relationship between power (dBm) and reported RSSI. Although absolute signal strength for WiFi signals can range from −60 dBm to −100 dBm, RSSI may not be reported in terms of dBm, but rather with an arbitrary number on an arbitrary scale. Furthermore, the number and scale can be dependent on implementation by a chip vendor. For example, a first chip manufacturer can report RSSI with an integer between 0 and 100. A second chip manufacturer can report RSSI with an integer between 0 and 60. Thus an RSSI of 50 from the first chip manufacturer can have a substantially different meaning when compared to an RSSI of 50 from the second chip manufacturer.

A second network performance data metric can be signal-to-noise ratio (SNR) 512. As the name implies, the SNR number describes a signal strength in relation to a noise floor. Similar to RSSI 510, different RATs can have different operating ranges of SNR 512 as well. For example, a range for SNR 512 for a WiFi signal can range from 0 to 32 dB, while a range for SNR 512 for LTE Advanced can be from 0 to 35 dB. Thus, just as for RSSI, direct comparison of SNR numbers attributed to different RATs can provide erroneous conclusions.

A third network performance data metric can be round trip time (RTT) 514. As mentioned in conjunction with FIG. 4, oftentimes an application running on a wireless device 210 can interact with server 445 that can be accessed through network 440. For those applications, the time required to transfer data to and from server 445 can directly affect responsiveness and performance as seen by the user. In one embodiment, the quality of a link to server 445 can be quantified with RTT 514. The RTT 514 can be a measure of round trip time of one or more data packets sent to and received from server 445. One example of a way to measure RTT 514 is through a "ping" packet. The ping packet is a special data packet typically sent to a specific address (such as server 445 or other particular computer or particular Internet Protocol address). The ping target responds to the ping sender with an acknowledge packet. The time difference between receiving the acknowledge packet and sending the ping packet can be the RTT 514. In some embodiments, more than one ping packet can be sent, and the RTT 514 time can be an average of two or more individual RTT times.

One advantage of RTT 514 metric is that the metric can quantify any additional delays that may be transient or intrinsic with a particular data pathway to server 445. For example, returning to FIG. 4, the wireless device 210 can try to measure RTT 514 to and from server 445 as accessed through access point 410 and network 440. If the access point 410 is an access point in accordance with IEEE 802.11, then a particular MCS may have been negotiated by the access point 410 and the wireless device 210. As is well-known, MCS can vary from one moment to another, based upon, among other things, quality of the wireless channel, distance from the wireless device 210 to access point 410, and physical impairments such as walls or furniture. Furthermore, MCS is not necessarily static, but can change as wireless channel conditions change. Thus, RTT 514 measurement can provide at least one measure of quality of the overall data path from wireless device 210 to server 445 and back and can capture transient and slowly varying channel performance aspects.

In another embodiment, a data pathway delay can be caused by relatively fixed processing delays attributed to one or more hardware devices. A first data pathway can be from wireless device 210, through cell phone tower 420, through service equipment 430, through network 440 and finally to server 445. A second data pathway can be from wireless device 210 through AP 410, through network 440 and finally to server 445. RTT 514 can be used quantify differences in time and therefore performance between first and second data pathways. A fixed processing delay due to service equipment 430 may come forth when comparing RTT 514 for each pathway.

A fourth network performance data metric can be power 516. An amount of power associated with transferring data through any particular RAT can be power 516. In one embodiment, power 516 can be described in joules per byte which can be the amount of energy (in joules) needed to transfer one byte of information. In other embodiments, power 516 can be joules per Kbyte, watts per byte, kilowatts per gigabyte or any other technically suitable power measurement. Power 516 can be determined through earlier characterizations (such as lab bench characterizations) of a particular RAT or, alternatively, the power 516 metric can be determined "on the fly" through measurements and data collected by hardware and/or software within wireless device 210 while wireless device 210 is active on a particular RAT. By way of example, in a WiFi network, power 516 can include transmit and receive power while operating at a particular MCS. The selected MCS may affect data transfer time requiring, for example, the transmitter to be on for longer periods of time when transmitting at a slower modulation.

By collecting and comparing network performance data 500, a more optimal RAT can be selected for operation by the wireless device 210. As described above in the discussion of RSSI 510 and SNR 512, direct comparison of collected network performance metrics 500 can lead to erroneous comparisons. Similar data from different networks under consideration may be normalized for a more fair comparison. Normalization may consider typical operation ranges as well as reported data formats. In one embodiment, normalization can be included as a process step after collection of the network performance data 500.

Normalization of RSSI 510 data can be determined by an allowable range of RSSI measurements for a particular RAT and a maximum RSSI also related to the particular RAT. One example of RSSI 510 normalization is described in Eq. 1, below:

$$RSSI_{NORM} = RSSI(adjusted)/RSSI\ Range \quad (eq.\ 1)$$

where

RSSI(adjusted) is the reported RSSI 510 adjusted in terms of minimum RSSI values associated with a particular RAT and RSSI Range is the RSSI range associated with a particular RAT.

For example, if a RAT has an RSSI range of from −100 dB to +20 dB, then the RSSI Range is 120 dB. The RSSI(adjusted) is the value of the reported RSSI 510 adjusted for the minimum allowable RSSI value. In other words, the RSSI (adjusted) value indicates where the reported RSSI value lies within the range of all RSSI values available for a particular RAT. Returning to the present example, if a RAT has an RSSI range of from −100 dB (minimum) to 20 dB (maximum), and an RSSI 510 value of −60 dB is reported, then the −60 dB value is 40 dB above the minimum RSSI. Thus, RSSI(adjusted) is 40 dB. Continuing the example, $$RSSI_{NORM}\ is\ 40/120 = 0.33. \quad (eq.\ 2)$$

In another embodiment, the RSSI can be reported with arbitrary values within an arbitrary range. This reporting structure can be typical for WiFi RATs. For example, RSSI 510 can be reported as an integer value within a range of possible integer values. For instance, an RSSI 510 value may be reported as 30 and the range of possible RSSI values can be from 0 to 60 where 60 is a maximum RSSI. The Max RSSI Range is the maximum RSSI value 60. Because RSSI values are already referenced to 0, no adjustments are needed for the reported RSSI value; therefore RSSI(adjusted) is 30. Thus $$RSSI_{NORM} = 30/60 = 0.5. \quad (eq.\ 3)$$

In a similar fashion, SNR 512 values can be normalized. Normalization can compensate for particular operational norms related to particular RATs. Each RAT can have an acceptable range of operational SNR 512 values. For example, a first RAT can have an SNR 512 that varies from 4 to 20 dB (a range of 16 dB). A second RAT can have an SNR 512 that varies from 0 to 40 dB (a range of 40 dB). Therefore, SNRs should be normalized to enable a more fair comparison of SNR values across different RATs.

$$SNR_{NORM} = SNR(adjusted)/SNR(range). \quad (eq.\ 4.)$$

where

SNR(adjusted) is the reported SNR 512 adjusted in terms of minimum SNR values associated with a particular RAT.

and

SNR(range) the maximum SNR range associated with a particular RAT.

For example, if a RAT has SNR values from 4 to 20 dB, then SNR(range) is 20−4=16 dB. If a RAT has a current SNR 512 value of 15 dB, then the SNR(adjusted) is 15−4=11 dB. Thus, normalized SNR is $$SNR_{NORM}\ is\ 11/16 = 0.6875. \quad (eq.\ 5)$$

Some network performance metrics can be independent of the underlying RAT and may not need to be normalized prior to comparing the same metric within other RATs. However, some care may need to be taken with some network performance metrics because some network performance metrics are "positive going" and some are "negative going". A positive going metric can be a metric that increases in value as connection conditions (quality) improves. Some examples of a positive going metric are RSSI 510 and SNR 512. A larger RSSI 510 or SNR 512 can indicate better conditions for a RAT. A negative going metric can be a metric that decreases in value as conditions (quality) improves. Some examples of a negative going metric are RTT 514 and Power 516. Smaller RTT 514 times or lower power 516 can indicate a better RAT. A useful comparison metric can accommodate both positive going and negative going network performance metrics.

A ranking equation can provide a comparison metric of a RAT based upon gathered network performance metrics. In some cases, a network performance metric can be normalized through an optional processing step, as described in (eq. 1) and (eq. 4) above. One embodiment of a ranking equation is:

$$\text{rank} = \frac{RSSI_{NORM} * SNR_{NORM}}{RTT * \text{Power}} \quad \text{(eq. 6)}$$

Where
$RSSI_{NORM}$ is as described in (eq. 1)
$SNR_{NORM}$ is as described in (eq. 4)
RTT is round trip time
Power is a power measurement such as power per byte.

When using (eq. 6) to compare different RATs, RTT and Power should be equivalent scales. For example, RTT for each RAT considered should all be reported in the same time scale such as milliseconds (ms), for example. Similarly, power for each RAT considered should reported in the same power scale, such as joules/byte.

In some embodiments, the ranking developed by (eq. 6) can be modified to emphasize certain performance metrics and de-emphasize other performance metrics. Such a modification can be useful when operating wireless device 210 under particular conditions. For example, if wireless device 210 is operating in an area with many available RATs to select from, then a ranking metric that emphasizes SNR over other network performance metrics may more optimally guide RAT selection. The amount of emphasis (or de-emphasis) of any particular performance metric can be emphasized by associating a weighting factor to each network performance metric as shown in (eq. 7).

$$\text{metric} = \frac{(a * RSSI_{NORM})(b * SNR_{NORM})}{(c * RTT)(d * \text{POWER})} \quad \text{(eq. 7)}$$

where
$RSSI_{NORM}$ is as described in (eq. 1)
$SNR_{NORM}$ is as described in (eq. 4)
RTT is reported round trip time
Power is a power measurement
and
a, b, c and d are weighting factors that can be applied to a performance metric.

Persons skilled in the art will recognize that additional performance metrics can be applied to (eq. 7) by expanding the equation by applying the additional metrics to the numerator (for positive going metrics) or the denominator (for negative going metrics) and multiplying the additional metric by a scaling factor as required. The metric developed by (eq. 7) can act as a ranking metric and can be applied to RATs under consideration by the wireless device 210. The ranking metric can enable RATs to be easily sorted by rank.

FIG. 6 is a table 600 of exemplary weighting profiles that can be applied to network performance metrics in accordance with the specification. By way of example, table 600 associates an operational mode 601 with particular weighting factors. In exemplary table 600, operational modes are arranged by rows. As shown, row 610 can include the weighting factors for an "equal weights" mode. Other modes can be SNR preferred 612, RTT preferred 614, Power preferred 616 and Equal weights (ignore power) 618. Persons skilled in the art will recognize that additional operational modes are possible and operational modes should not be limited to the examples set forth herein. Column 602 includes the weighting factor for $RSSI_{NORM}$ (a), column 604 includes the weighting factor for $SNR_{NORM}$ (b), column 606 shows the weighting factor for RTT (c) and column 608 shows the weighting factor for power (d).

In table 600, an operational mode 601 can be associated with weighting factors that can be applied to network performance metrics to emphasize or de-emphasize a particular network performance metric in the calculation of a metric. For example in SNR preferred (ignore power) 612 mode, SNR 604 is given more weight in metric calculation of (eq. 7) with a greater weighting factor compared to RSSI 602 and RTT 606. Power 608 is de-emphasized with a weighting factor of 0. Operating in SNR preferred (ignore power) 612 mode can be useful when wireless device 210 is operating in an area where there are many different RATs to select from such as a crowded urban environment. In contrast, an equal weights 610 mode can apply equal weights to all network performance metrics. Equal weights 610 mode can be useful when no emphasis or bias is desired for any one network performance metric. Slight variant, equal weights (ignore power) 618 effectively de-emphasizes power 608 while maintaining equal weights on all network performance metrics.

RTT preferred 614 mode can apply a greater weighting factor to RTT 608 relative to RSSI 602, SNR 604 and power 608. RTT preferred 614 mode can be useful when wireless device 210 runs an application that transfers data to and from a particular server, such as an email application. In this example, the RTT values can indicate data travel time to and from an email server. Thus, a preferred RAT selection may include relatively greater RTT weights 606 compared to RSSI 602, SNR 604 or Power 608 weights. Power preferred 616 mode can apply a greater weighting factor to power 608 relative to RSSI 602, SNR 604, and RTT 606. Power preferred 616 mode can be useful when wireless device 210 operates under battery power and a user would like to prolong battery life.

An operational mode, as set forth in table 600 can modify (eq. 7) to provide a metric that can emphasize certain network performance metrics. As described, this modification can be useful under certain operating conditions. In one embodiment, a selected operational mode 601 can provide initial weighting factors 602, 604, 606 and 608. In another embodiment, as wireless device 210 operates, adjustments can be made to weighting factors 602, 604, 606 and 608. For example, if equal weights 610 mode is selected, all weighting factors 602, 604, 606 and 608 can be initially set to 0.25. If during operation, battery life becomes more important, then the weighting factor for power 608 can be increased from 0.25 to 0.26. Similarly, other adjustments to other weighting factors can be made to emphasize or de-emphasize other network performance metrics. Thus, although a particular operational mode can be selected, adjustments to weighting factors can be made without departing from the selected operational mode.

In some embodiments, the sum of the weighting factors can be made a constant value. For example, the sum of the weighting factors can be 1.0. In those embodiments, increasing a weighting factor for one particular network performance metric can be matched by a similar reduction of one or more other network performance metrics to maintain a constant sum.

Figure 7:
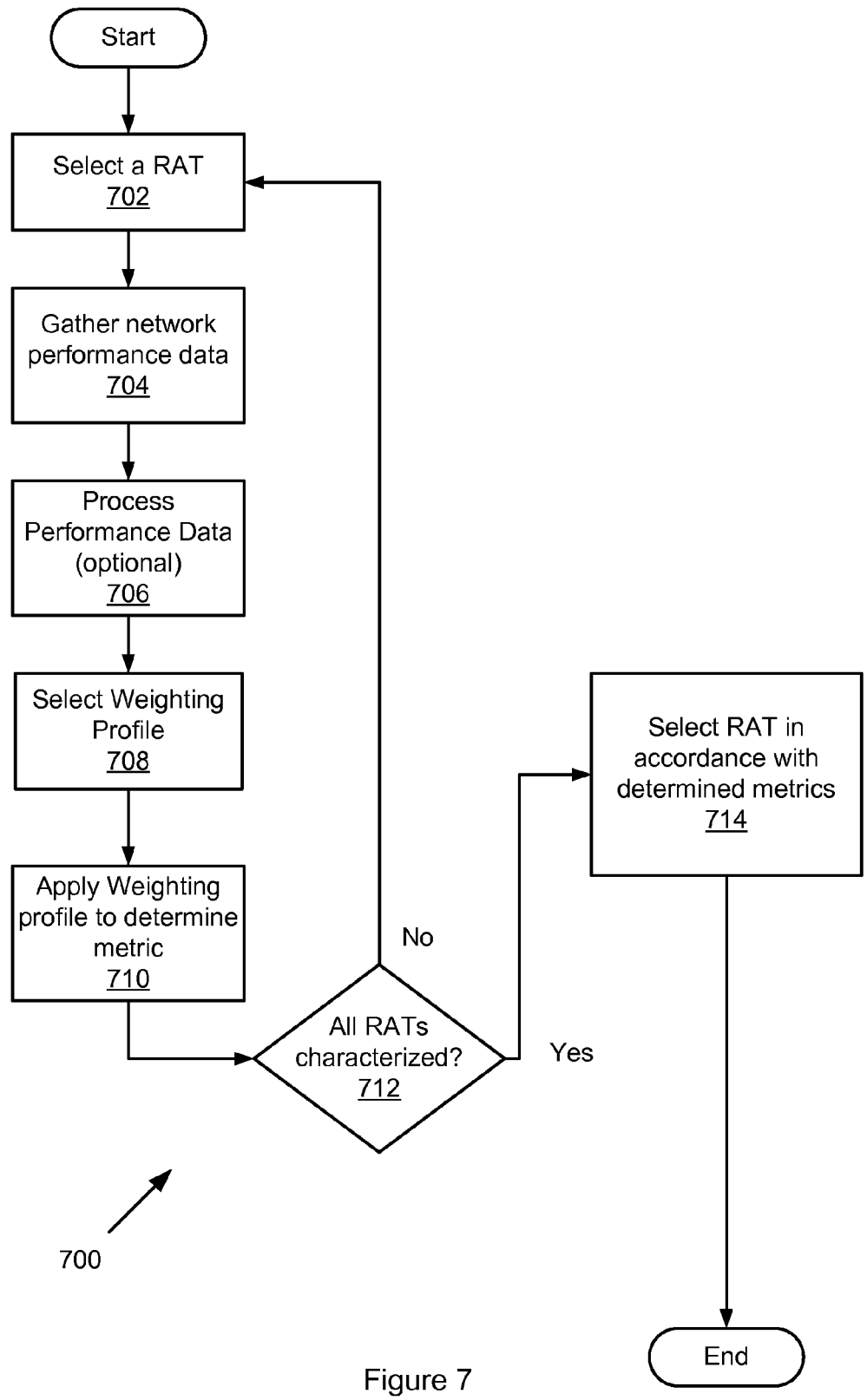
FIG. 7 is a flow chart of method steps for selecting a radio access technology.

FIG. 7 is a flow chart of method steps 700 for selecting a radio access technology. Persons skilled in the art will understand that any system configured to perform the method steps in any order is within the scope of this description. Although the method is described in terms of being performed by the wireless device 210, the method can be performed by a processor, firmware, hardware, or a processor executing computer readable non-transient instructions.

The method begins in step 702 where a RAT is selected for characterization. In step 704 wireless device 210 gathers network performance data for the RAT to be characterized. Network performance data can include wireless network performance metrics such as RSSI 510, SNR 512, RTT 514 and energy metrics such as power per bit 516. In step 706 the network performance data can be optionally processed. For example, in one embodiment RSSI 510 data can be processed and normalized as described in (eq. 1). In another embodiment, SNR 512 data can be processed and normalized as described in (eq. 4). The optional processing step 706 can enable a comparison of network performance data between non-similar networks. Non-similar networks can be two or more networks where operational parameters (and therefore network performance data) is not substantially similar to allow the network performance data to be directly compared.

In step 708, the wireless device 210 can select a weighting profile 601. Weighting profile 601 can be used to emphasize the importance of particular network performance metrics and de-emphasize other network performance metrics. As described above, particular weighting profiles can be used to enable wireless device 210 to select a wireless network better suited for certain operating conditions.

In step 710, the selected weighting profile can be applied to the gathered (and optionally processed) network performance data. In one embodiment, weighting factors determined by selected weighting profile can be applied using (eq. 7). Eq. 7 can determine a metric associated with each RAT under consideration. Metrics determined by (eq. 7) can be stored in a priority table. The priority table can be inspected to compare determined RAT metrics. In one embodiment, the priority table can be stored in memory. In step 712, wireless device 210 can determine if all RATs have been characterized. If all RATs have not been characterized, then the method returns to step 702. If all RATs have been characterized, then in step 714, wireless device 210 can select a RAT in accordance with the metrics determined in step 710. In one embodiment, available RATs can be characterized serially as described with this method. In another embodiment, available RATs can be characterized in parallel.

Figure 10:
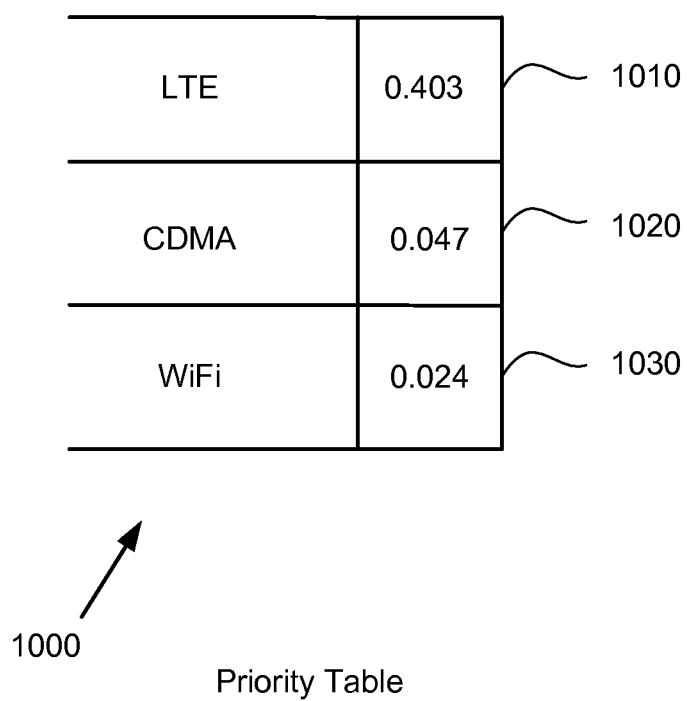
FIG. 10 is a priority table showing the results of the metric calculations, in accordance with the specification.

By way of example, and not limitation, the method of FIG. 7 can be illustrated with FIGS. 8, 9 and 10. FIG. 8 shows exemplary network performance data gathered for three RATs under consideration. In some embodiments, different numbers of networks may be available for selection by the wireless device. As shown in table 800, each RAT under consideration is laid out in a row. Columns in table 800 set forth network performance data. Row 802 illustrates data associated with an LTE Advanced cell phone network, row 804 illustrates data associated with a WiFi network and row 806 illustrates data associated with a CDMA network.

Column 810 shows RSSI values for each of the RATs under consideration. Although each RAT can have an RSSI measurement, in some embodiments, RSSI ranges can vary for different RATs. As described in conjunction with FIG. 6, the range of RSSI values available for a first RAT can be different than the range of RSSI values for a second RAT. Column 812 shows SNR values for each RAT. As was the case for RSSI values, SNR values can also have different acceptable ranges for different RATs. For example, LTE SNR can range from 0 to 30 dB, while for WiFi SNR can range from 0 to 35 dB.

Column 814 shows RTT for each RAT in ms. Column 816 shows an energy metric for each RAT; in this example the energy metric is joules/kByte.

FIG. 9 illustrates optionally processing network performance data as set forth in (eq. 1) and (eq. 4) and set forth in step 706. In some embodiments, operational ranges and operational parameters between different networks can be different so comparing absolute measurements cannot provide a fair comparison. In those embodiments, processing (normalizing) can beneficially scale the network performance data so that the data can be more fairly compared between different RATs. For example, WiFi RATs can have RSSI operational limits of between −110 dBm to 0 dBm providing a Max RSSI range of 110 dBm. LTE advanced can have RSSI operational limits of between −110 dBm to −48 dBm providing a Max RSSI range of 62 dBm. CDMA can have RSSI operational limits of −120 dBm to −15 dBm providing a Max RSSI range of 105 dBm.

Using values for RSSI illustrated in Table 8 and predefined RSSI operational limits described above, $RSSI_{NORM}$ values can be calculated. For LTE advanced 802, a RSSI of −60 dBm (as shown in Table 8) viewed in light of a −110 dBm minimum provides a RSSI(adjusted) of 50. Applying (eq. 1) yields $$RSSI_{NORM}(LTE)=RSSI(adjusted)/Max\ RSSI\ Range=50/62=0.806$$

For WiFi 804, a RSSI of −60 dBm (as shown in Table 8) viewed in light of a −110 dBm minimum also provides a RSSI(adjusted) of 50. Applying (eq. 1) yields $$RSSI_{NORM}(WiFi)=RSSI(adjusted)/Max\ RSSI\ Range=50/110=0.455$$

For CDMA 806, a RSSI of −50 dBm viewed in light of a −120 dBm minimum provides a RSSI(adjusted) of 70. Applying (eq. 1) yields $$RSSI_{NORM}(CDMA)=RSSI(adjusted)/Max\ RSSI\ Range=70/105=0.667$$

Similar to RSSI network performance data, SNR data can be processed to enable a more fair comparison of SNR values between RATs with different operational SNR range. Continuing the exemplary RATs set forth in Table 8, the SNR values for LTE advanced can be from 0 to 30 dB. The SNR values for WiFi can be from 0 to 35 dB and the SNR values for CDMA can be from 0 to 35 dB. In this example, SNR values are positive going with 0 dB being a minimum. Thus, SNR (adjusted) values are equivalent to the measured SNR.

Using the values for SNR set forth in Table 8, and the allowable SNR values set forth above, $SNR_{NORM}$ values can be calculated. For LTE advanced 802, $$SNR_{NORM}=SNR(adjusted)/SNR(range)=30/30=1.0.$$

For WiFi 804:

$$SNR_{NORM}=SNR(adjusted)/SNR(range)=25/35=0.714.$$

For CDMA 806:

$$SNR_{NORM}=SNR(adjusted)/SNR(range)=30/35=0.857.$$

Table 900 shows the normalized network performance data. The RSSI data is replaced with $RSSI_{NORM}$ 910 and the SNR data is replaced with $SNR_{NORM}$ 912. The RTT 914 and Power 916 are carried over from Table 800. A weighting profile can be selected and applied to the data showing in Table 900. Each application of a selected weighting profile, in combination with (eq. 7) can provide a metric for each RAT in Table 900. For the purposes of this example, RTT preferred 614 profile from Table 600 is selected. This specifies weighting factors of 0.2 for $RSSI_{NORM}$ 910, 0.2 for $SNR_{NORM}$ 912, 0.4 for RTT 914 and 0.2 for Power 916.

Using (eq. 7) the metric for LTE advanced 802 can be calculated as:

$$\text{metric}(LTE) = \frac{(0.2*0.806)(0.2*1)}{(0.4*40)(0.2*0.25)} = 0.403$$

Similarly for WiFi 804 and CDMA 806

$$\text{metric}(WiFi) = \frac{(0.2*0.455)(0.2*0.714)}{(0.4*45)(0.2*0.15)} = 0.024$$

$$\text{metric}(CDMA) = \frac{(0.2*0.667)(0.2*0.850)}{(0.4*60)(0.2*0.1)} = 0.047$$

FIG. 10 is a priority table 1000 showing the results of the metric calculations illustrated above performed on the data of Table 900. The entries in the priority table can be sorted in order from largest to smallest thereby ranking the calculated metrics and thus the related RATs. In this example, LTE advanced metric 1010 was the greatest, CDMA metric 1020 was the next largest and WiFi metric 1030 was the smallest. The largest calculated metric is associated with the RAT with the most favorable weighted network performance metrics. In one embodiment, wireless device 210 can select the RAT with the largest metric in the priority table. the priority table can be stored in a memory by a processor, state machine, software or the like. The metrics determined by (eq. 7) can be considered unit less. The final values determined by (eq. 7) can be scaled up or down as may be convenient for further processing.

Figure 11:
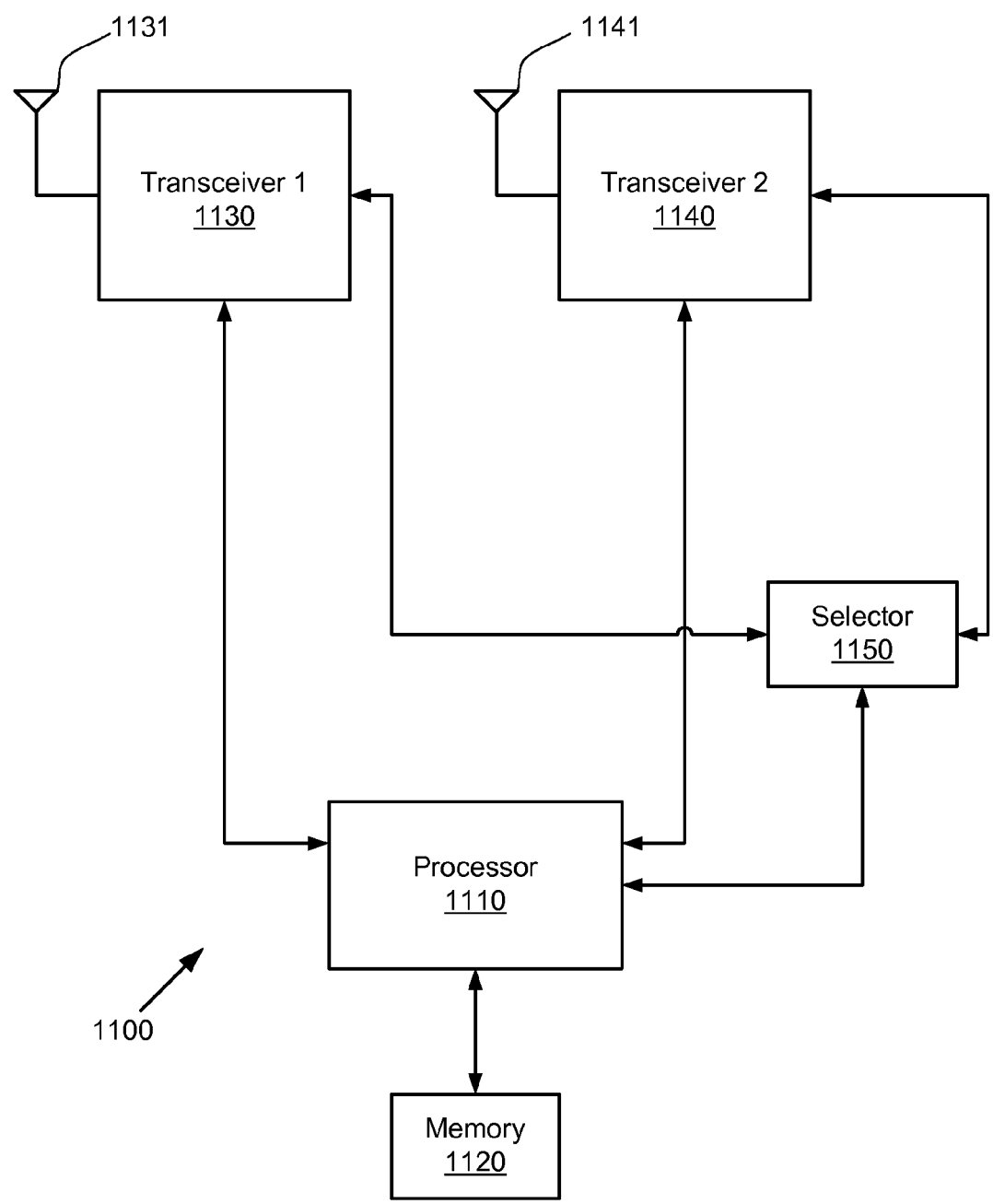
FIG. 11 is a block diagram of another embodiment of a wireless device.

FIG. 11 is a block diagram of another embodiment of a wireless device 1100. Wireless device 1100 can include processor 1100, memory 1120, first transceiver 1130, second transceiver 1140 and selector 1150. In one embodiment, first transceiver 1130 can implement a different wireless technology than second transceiver 1140. For example, first transceiver 1130 can be a LTE advanced transceiver and second transceiver 1140 can be a WiFi transceiver. Although wireless device 1100 includes only two transceivers, other embodiments can include more than two transceivers. Continuing the example, first transceiver 1130 can be coupled to antenna 1131 to transmit and receive LTE advanced signals, and second transceiver 1141 can be coupled to antenna 1141 to transmit and receive WiFi signals.

Processor 1110 can execute non-transitory computer code stored in memory 1120 to perform method steps for selecting a RAT (i.e. transceiver) as discussed in conjunction with FIG. 7. In some embodiments, processor 1110 can store priority table 1000 in memory 1120. When a RAT is selected, data to be transmitted or received can be coupled to and from the selected transceiver by way of selector 1150 to processor 1110.

Figure 12:
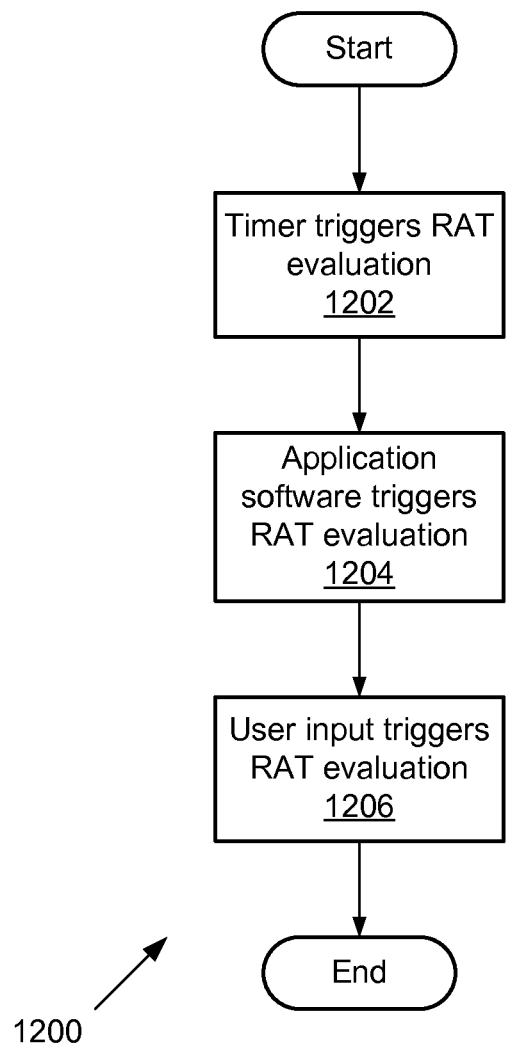
FIG. 12 is a flowchart of method steps for determining when to evaluate radio access technologies for selection.

FIG. 12 is a flowchart of method steps for determining when to evaluate RATs for selection 1200. In one embodiment, the evaluation and selection can be implemented as described in FIG. 7. The method begins in step 1202 where a timer can trigger the evaluation. In one embodiment, a timer can trigger a periodic evaluation of available RATs. For example, available RATs can be evaluated every three minutes. In step 1204, software can trigger an evaluation of available RATs. For example, mobile device 210 can be relatively idle. If an application, such as a web browser becomes active, then access to a data network can be required. The application or operating system software can trigger RAT evaluation in response to the web browser. In another example, prior to mobile device 210 executing an application that requires connectivity to a particular server, the mobile device can evaluate available RATs and, in particular, weight the performance metrics with regards to RTT times to the particular server. To illustrate, before running an email application, the mobile device 210 can evaluate RATs with respect to RTT times to the email server. In step 1206, the user can trigger an evaluation of available RATs. For example, the user may be experiencing slow responsiveness within an application. The user can trigger a RAT evaluation to determine if a relatively better network connection is possible. The method then ends.

In one embodiment, wireless device 210 can perform only one of the steps shown in FIG. 12 to determine when to evaluate a RAT. In another embodiment, more than one step may be executed. For example, RAT evaluation can be triggered by both a timer (step 1202) and software (step 1204). In yet another embodiment, two or more of the steps of method 1200 can be performed in parallel.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for selecting a radio access technology (RAT) for use by a wireless device, the method comprising:
at the wireless device:
gathering network performance data corresponding to radio access technologies available to the wireless device;
selecting a weighting profile corresponding to an operational mode;
weighting the network performance data in accordance with the selected weighting profile;
determining a ranking metric in accordance with the weighted network performance data; and
selecting a radio access technology in accordance with the determined ranking metric,
wherein the weighting profile is selected from a plurality of weighting profiles that includes (i) at least one weighting profile having equal-valued weighting factors for each type of network performance data, and (ii) at least one weighting profile having a higher-valued weighting factor for a first type of network performance data than for other types of network performance data.

2. The method as recited in claim 1, wherein the ranking metric is defined as:

$$\text{ranking metric} = \frac{(a*RSSI_{NORM})(b*SNR_{NORM})}{(c*RTT)(d*\text{POWER})}$$

where:
$RSSI_{NORM}$ is a normalized received signal strength indicator;
$SNR_{NORM}$ is a normalized signal to noise ratio;
RTT is a round trip time;
POWER is a power measurement; and
a, b, c and d are weighting factors in accordance with the selected weighting profile.

3. The method as recited in claim 1, wherein the network performance data comprises a round trip time (RTT) that indicates an amount of time for data to transfer between the wireless device and an internet protocol (IP) address.

4. The method as recited in claim 1, wherein the network performance data comprises a power metric descriptive of an amount of power used by the wireless device to transfer an amount of data.

5. The method as recited in claim 4, further comprising:
determining the power metric for a particular RAT while the wireless device operates in accordance with the particular RAT.

6. A wireless device capable of connecting through one of at least two radio access technologies, the wireless device comprising:
a first radio transceiver;
a second radio transceiver, wherein a first radio access technology of the first radio transceiver is different from a second radio access technology of the second radio transceiver; and
a selector for coupling data between a processor and the first and the second radio transceivers, wherein the processor is configured to cause the wireless device to select the first or the second radio transceiver by:
gathering radio performance data from the first and the second radio transceivers;
weighting the radio performance data based on a weighting profile;
determining at least one metric in accordance with the weighted radio performance data; and
selecting the first or the second radio transceiver in accordance with the at least one metric,
wherein the weighting profile is one of a plurality of weighting profiles that includes (i) at least one weighting profile having equal-valued weighting factors for each type of radio performance data, and (ii) at least one weighting profile having a higher-valued weighting factor for a first type of radio performance data than for other types of radio performance data.

7. The wireless device as recited in claim 6, wherein the gathering is performed in response to executing an application, and weighting the radio performance data includes using a set of weighting factors that depend at least in part on the application.

8. A non-transitory computer readable medium for storing computer code executable by a processor in a wireless device having at least two wireless data transceivers, and a memory, the non-transitory computer readable medium comprising:

computer code for gathering network performance data;
computer code for selecting a weighting profile;
computer code for weighting the network performance data using the weighting profile;
computer code for determining at least one metric in accordance with weighted network performance data; and
computer code for selecting a radio transceiver in accordance with the at least one metric,
wherein the weighting profile is selected from a plurality of weighting profiles that includes (i) at least one weighting profile having equal-valued weighting factors for each type of network performance data, and (ii) at least one weighting profile having a higher-valued weighting factor for a first type of network performance data than for other types of network performance data.

9. The non-transitory computer readable medium as recited in claim 8, wherein the gathering is in response to the processor executing an application, and selecting the weighting profile depends at least in part on the application.

10. The non-transitory computer readable medium as recited in claim 8, wherein the network performance data includes one or more of: (i) a power per data unit used by the wireless device determined for data collected by the processor, and (ii) a round trip time (RTT) that indicates an amount of time to transfer data between the wireless device and an internet protocol (IP) address.

11. The method as recited in claim 1, wherein the plurality of weighting profiles includes at least one weighting profile having a zero-valued weighting factor.

12. The method as recited in claim 1, further comprising:
obtaining a user input to select the operational mode from a plurality of operational modes.

13. The method as recited in claim 12, wherein the plurality of operational modes includes a first operational mode that prioritizes data throughput performance higher than power consumption by the wireless device and a second operational mode that prioritizes power consumption by the wireless device higher than data throughput performance.

14. The method as recited in claim 1, wherein the operational mode indicates operation of the wireless device under battery power, and the weighting profile selected weights a power metric higher than other network performance data metrics.

15. The method as recited in claim 1, wherein the weighting profile selected includes a set of initial values for the plurality of weighting factors of the weighting profile, and further comprises:
adjusting values of the plurality of weighting factors of the weighting profile during operation of the wireless device.

16. The method as recited in claim 15, wherein a first weighting factor in the plurality of weighting factors is applied to a power metric, and adjusting values of the plurality of weighting factors includes adjusting the first weighting factor based on an amount of battery power available in the wireless device.

17. The wireless device as recited in claim 6, further comprising a battery,
wherein the weighting profile includes one or more weighting factors that depend on an amount of power available to the wireless device stored in the battery.

18. The method as recited in claim 1, wherein the weighting profile includes one or more weighting factors that prioritize either data throughput or power consumption over other types of network performance data.

19. The wireless device as recited in claim 6, wherein the plurality of weighting profiles includes at least one weighting profile having a zero-valued weighting factor.

20. The non-transitory computer readable medium as recited in claim 8, wherein the plurality of weighting profiles includes at least one weighting profile having a zero-valued weighting factor.

\* \* \* \* \*